United States Patent [19]

Driver et al.

[11] 4,433,859
[45] Feb. 28, 1984

[54] WELLHEAD CONNECTOR WITH RELEASE MECHANISM

[75] Inventors: Gary R. Driver; Richard J. Herman, both of Houston, Tex.

[73] Assignee: NL Industries, Inc., New York, N.Y.

[21] Appl. No.: 284,008

[22] Filed: Jul. 16, 1981

[51] Int. Cl.³ ............................................. F16L 37/08
[52] U.S. Cl. ........................................ 285/34; 285/86; 285/315; 285/317; 285/320; 285/DIG. 21
[58] Field of Search ................... 285/34, 35, 315, 316, 285/DIG. 21, 18, 86, 320, 317

[56] References Cited

U.S. PATENT DOCUMENTS

| | | | |
|---|---|---|---|
| 3,097,866 | 7/1963 | Iversen | 285/91 X |
| 3,222,088 | 12/1965 | Haeber | 285/316 X |
| 3,321,217 | 5/1967 | Ahlstone | 285/315 X |
| 3,339,947 | 9/1967 | Maisey | 285/320 X |
| 4,057,267 | 11/1977 | Jansen | 285/DIG. 21 |
| 4,114,928 | 9/1978 | Lochte | 285/18 |
| 4,335,904 | 6/1982 | Saliger et al. | 285/DIG. 21 |

*Primary Examiner*—Dave W. Arola
*Attorney, Agent, or Firm*—Browning, Bushman, Zamecki & Anderson

[57] ABSTRACT

A wellhead connector comprises a tubular main body movably mounting a set of circumferentially spaced members for radial extension and retraction. An actuator on the main body is operatively associated with the members to radially extend them. Levers are interengaged between the main body and the members, when the latter are extended, and are operative to at least partially retract the members.

18 Claims, 7 Drawing Figures

WELLHEAD CONNECTOR WITH RELEASE MECHANISM

BACKGROUND OF THE INVENTION

The present invention pertains particularly to wellhead connectors although it may be applied to other types of apparatus in which two tubular bodies are coaxially connected by radially extendable means carried by one of the bodies. A typical wellhead connector includes a generally tubular main body movably mounting a set of latch dogs for radial extension and retraction. The latch dogs, when extended, engage mating formations on the wellhead so as to prevent upward movement of the connector from the wellhead. In some connectors radial movement of the dogs is rectilinear, while in others, it is pivotal.

In a recent improvement in wellhead connectors, the main body also movably mounts support means, such as a split ring or a second set of circumferentially spaced members, for radial extension and retraction at least partially independently of the latch dogs. In operation, the latch dogs and support means are successively radially extended. The latch dogs are moved to their extended positions without the transmission of any substantial longitudinal force to the wellhead. Thus the relatively hard latch dogs do not "plow" or gouge into the necessarily soft metal of the wellhead. The support means are then extended to wedge between the latch dogs and the main body. This tightens the connection longitudinally. However, since there is no direct contact between the support means and the wellhead, the latter is still protected from deformation.

In such improved connector, a release means is needed not only to initially break the tight wedging fit of the support means between the latch dogs and main body, but also to completely retract the support means. Since the support means are preferably linked to the latch means, the latter can thereby be indirectly retracted.

SUMMARY OF THE INVENTION

The present invention pertains to such release means. While particularly applicable to the improved connector described above for retraction of the support means, the principles of the invention can also be applied to more conventional wellhead connectors for directly retracting the latch dogs.

In particular, the release means of the present invention comprises lever means interengaged between the main body and the support means (or other radially movable means) when the latter are extended and operative to at least partially radially retract said support means. In an exemplary embodiment, the apparatus includes an actuator, or drive means such as a longitudinally reciprocable piston which, upon extension in a first direction, successively radially extends the latch dogs and support means. In such embodiment, said drive means is preferably further operatively associated with the lever means to operate them upon longitudinal retraction in a second direction opposite to the first.

In preferred embodiments, particularly where the connector includes support means as described above, the levers of the release means include at least one set, having relatively short lever arms, for providing initial release of the support means from their tightly wedged position between the latch dogs and the main body. Since relatively high forces must be applied for such inital release, the relatively short lever arms of this first set of levers minimizes the potential for breakage thereof. Nevertheless, this first set of levers can be designed in such a way that, if they do break, they will not interfere with operative movements of other parts of the apparatus. More specifically, each of the levers of the first set may be pivotally mounted on a respective one of the support members, its force-receiving arm being engageable with and movable by the actuator, and its force-transmitting arm being engageable with the main body of the connector.

A second set of levers, having relatively long lever arms as compared with the first set, may be provided for completing the retraction of the support members and/or latch dogs. The actuator is preferably designed to successively operate the first and second levers on its retraction stroke. The second set of levers not only provide for complete retraction of the support members, but also provide a back up means for retracting said members should the first levers, or any of them, fail. The second levers may each be pivotally carried by the main body, with its force-receiving arm engageable with and movable by the actuator, and its force-transmitting arm engageable with a respective one of the support members. Additional back up means, such as springs, biasing the members to their retracted positions, may also be provided.

Accordingly, it is a principal object of the present invention to provide a release system for effecting retraction of a set of radially movable members on a wellhead connector.

Another object of the present invention is to provide such a release system comprising at least one set of levers, each of which is operatively associated with a respective one of said members.

Still another object of the present invention is to provide such a system including two sets of levers arranged for successive operation.

Still other objects, features, and advantages of the present invention will be made apparent by the following detailed description of a preferred embodiment, the drawings, and the claims.

DETAILED DESCRIPTION

Figure 1:
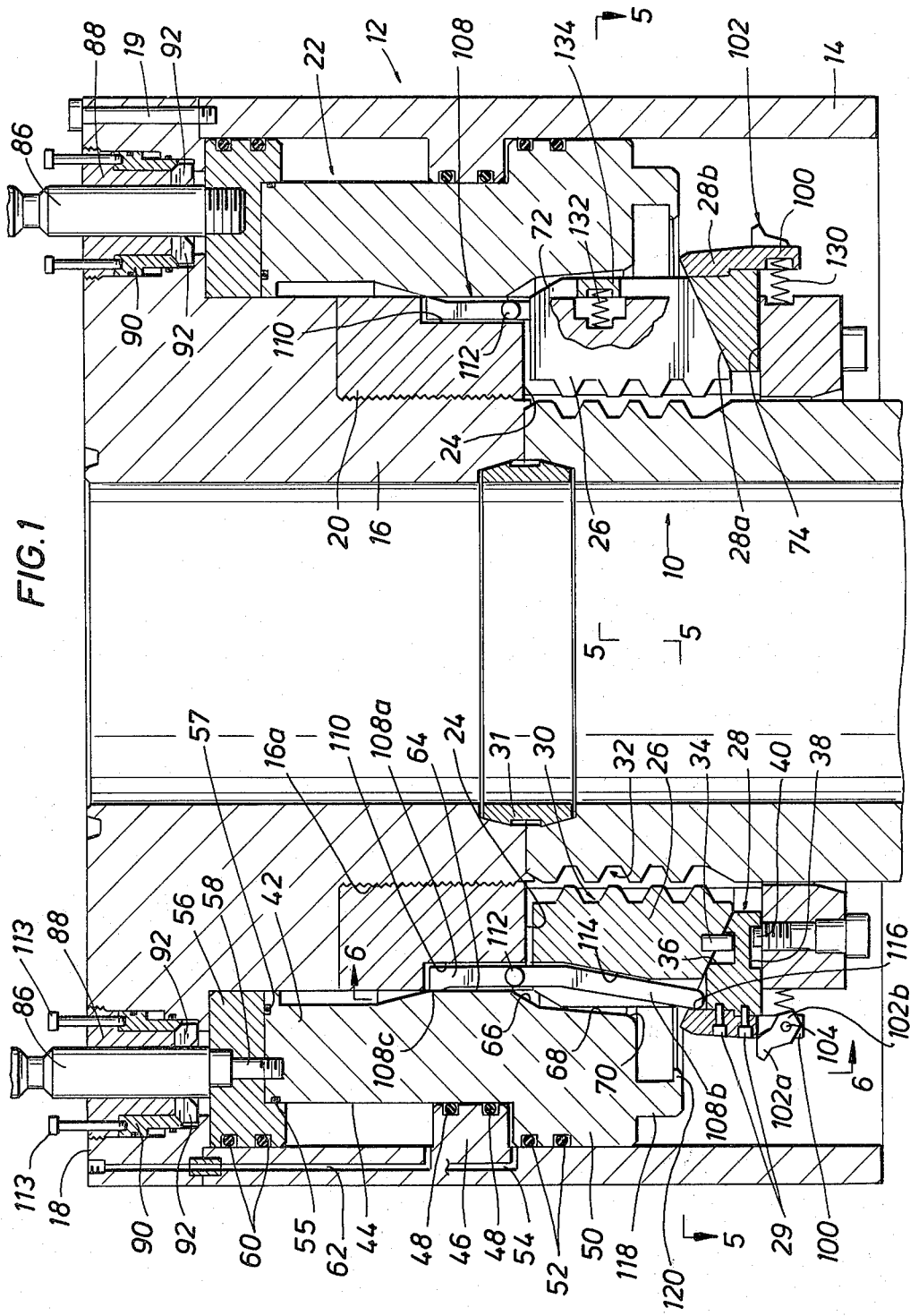
FIG. 1 is a longitudinal cross-sectional view through a wellhead connector according to the present invention taken along the line 1—1 in FIG. 5.

FIG. 1 shows a typical wellhead 10 and a wellhead connector, generally denoted by the numeral 12, for connection thereto. Connector 12 may in turn mount a blowout preventor stack or any other apparatus which is to be ultimately connected to the wellhead 10. Connector 12, as a whole, is tubular and is to be connected to wellhead 10 in generally coaxial alignment. More specifically, connector 12 includes a tubular main body comprising an annular outer wall 14 and an annular inner wall 16. Inner wall 16 has an integral flange 18 extending radially outwardly from its upper end and connected to outer wall 14 by screws 19. The main body further includes a generally cylindrical cage 20 which is threadedly connected to a reduced diameter portion 16a of inner wall 16 and extends downwardly therefrom to form an extension of said inner wall. The outer wall 14 is radially spaced from inner wall 16 and its extension 20 so that an annular space is formed therebetween. An actuator in the form of a longitudinally reciprocable annular piston 22, to be described more fully below, is mounted in said annular space.

Figure 5:
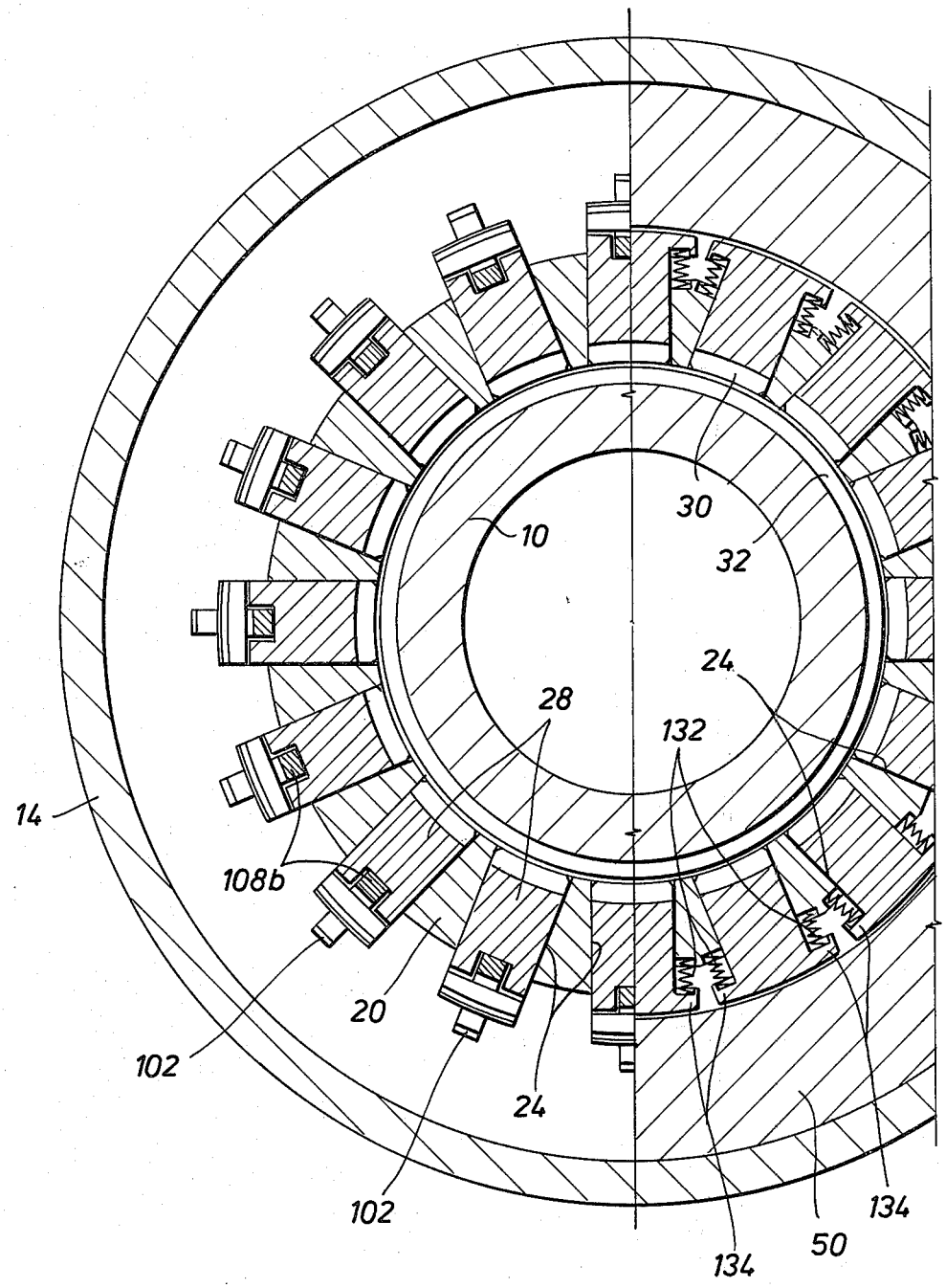
FIG. 5 is a transverse cross-sectional view taken along the line 5—5 in FIG. 1.

As may be seen by comparing FIGS. 1 and 5, cage 20 has a plurality of circumferentially spaced windows 24 opening radially therethrough. The latches for the wellhead connector are formed by a first set of circumferentially spaced members in the form of latch dogs 26, each of which is mounted in a respective one of the windows 24 in cage 20. A second set of circumferentially spaced members in the form of support members or wedges 28 is provided to form the support means of the device. Each wedge 28 is mounted in a respective one of the windows 24 below the respective latch dog 26 and comprises an inner portion 28a and an outer portion 28b secured thereto by screws 29.

Latch dogs 26 have, on their radially inner sides, saw tooth formations, generally denoted by the numeral 30, configured to mate with similar saw tooth formations 32 defined by circumferential grooves formed on the outer diameter of wellhead 10 near its upper end. It can be seen that, if the latch dogs 126 are extended radially inwardly so that formations 30 and 32 are matingly engaged, the wellhead connector will be effectively latched to the wellhead 10. Each latch dog 26 carries a pin 34 which extends downwardly from the latch dog 26 and into a slot 36 in the respective support member or wedge 28 therebelow. Pins 34 and recesses 36 permit limited relative radial movement between the latch dogs 26 and support members 28 in a manner to be described more fully below. Similarly, each support member 28 has a slot 38 receiving a respective pin 40 mounted in cage 20 and extending upwardly into the respective one of the windows 24. Pins 40 and slot 38 permit limited relative radial movement between support members 28 and cage 20, and serve to retain members 28 from becoming completely dislodged from cage 20, dogs 26 in turn being retained with respect to members 28 by pins 34.

Piston 22 includes a cylindrical member 42 having a portion 44 of reduced outer diameter, portion 44 being engaged by an annular flange 46 extending radially inwardly from outer body wall 14. The inner surface of flange 46 is sealed with respect to reduced diameter piston portion 44 by O-rings 48, and the enlarged diameter portion 50 of the piston member 42 below portion 44 is sealed with respect to wall 14 by O-rings 52. Accordingly, a first piston head is defined by the annular area of portion 50 between O-rings 48 and O-rings 52. If fluid pressure is admitted to the area between flange 46 and piston portion 50 through a passageway partially shown at 54, the piston may be urged downwardly. The piston assembly further comprises a ring 56 fixed to the upper end of member 42 by screws 58. Ring 56 is sealed with respect to member 42 by O-rings 55 and 57. The outer diameter of ring 56 is the same as that of portion 50 of piston member 42, and is sealed with respect to outer body wall 14 by O-rings 60. Thus, if fluid pressure is admitted to the area between flange 46 and the second piston head formed by ring 56 through passageway 62, the piston assembly 42, 56 can be urged upwardly.

FIG. 1 shows piston assembly 42, 56 in its uppermost position, which will be referred to herein as its "longitudinally retracted" position, and the members 26 and 28 in their radially outermost positions, which will be referred to herein as their "radially retracted" positions. These are the positions in which the parts would be disposed as the wellhead connector is lowered over wellhead 10. Suitable guide means (not shown) would be provided to coaxially align the wellhead connector and wellhead. Downward movement would be stopped by abutment of the lower end of inner body wall 16 with the upper end of wellhead 10 as shown in FIG. 1.

A conventional annular sealing device 31 carried at the lower end of inner body wall 16 engages in a counterbore in the upper end of wellhead 10. At such point, the formations 30 and 32 are then in alignment with each other. To bring these formations into latching engagement, fluid pressure would be admitted through passageway 54 to lower piston 22. (While various steps in the latching and unlatching process are shown in various figures, it will be helpfull to also refer to FIG. 1 throughout the description of the operation of the tool.) The inner surface of piston member 42 along its lower half has a generally stepped configuration including a straight vertical section 64. Adjoining the lower end of section 64 is a longitudinally and radially outwardly inclined section 66. Adjoining the lower end of section 66 is a section 68 which, while it is also longitudinally and radially outwardly inclined, has a much smaller radial component of direction so that it is more nearly vertical than section 66. Finally, adjoining the lower end of section 68, is a short section 70 inclined at about the same angle as section 66. As piston 22 is lowered, section 66 of the inner surface of piston member 42 will come into engagement with matingly inclined surfaces 72 formed at the upper outer corners of latch dogs 26. Accordingly, as piston 22 is further lowered, surfaces 66 and 72 will act as cam surfaces to push latch dogs 26 radially inwardly. Because pins 34 are disposed at the inner extremities of slots 36, wedges 28 will be urged inwardly along with dogs 26. However, to positively ensure such inward movement of wedges 28, surface 70 on piston member 42 engages matingly tapered surfaces 76 on the upper outer corners of wedges 28 to directly cam them inwardly. Support wedges 28 have horizontal lower surfaces which slidingly engage the horizontal surfaces 74 at the bottoms of windows 24 to slidingly guide the wedges 28, and thus indirectly the dogs 26, in such radially inward movement.

Figure 2:
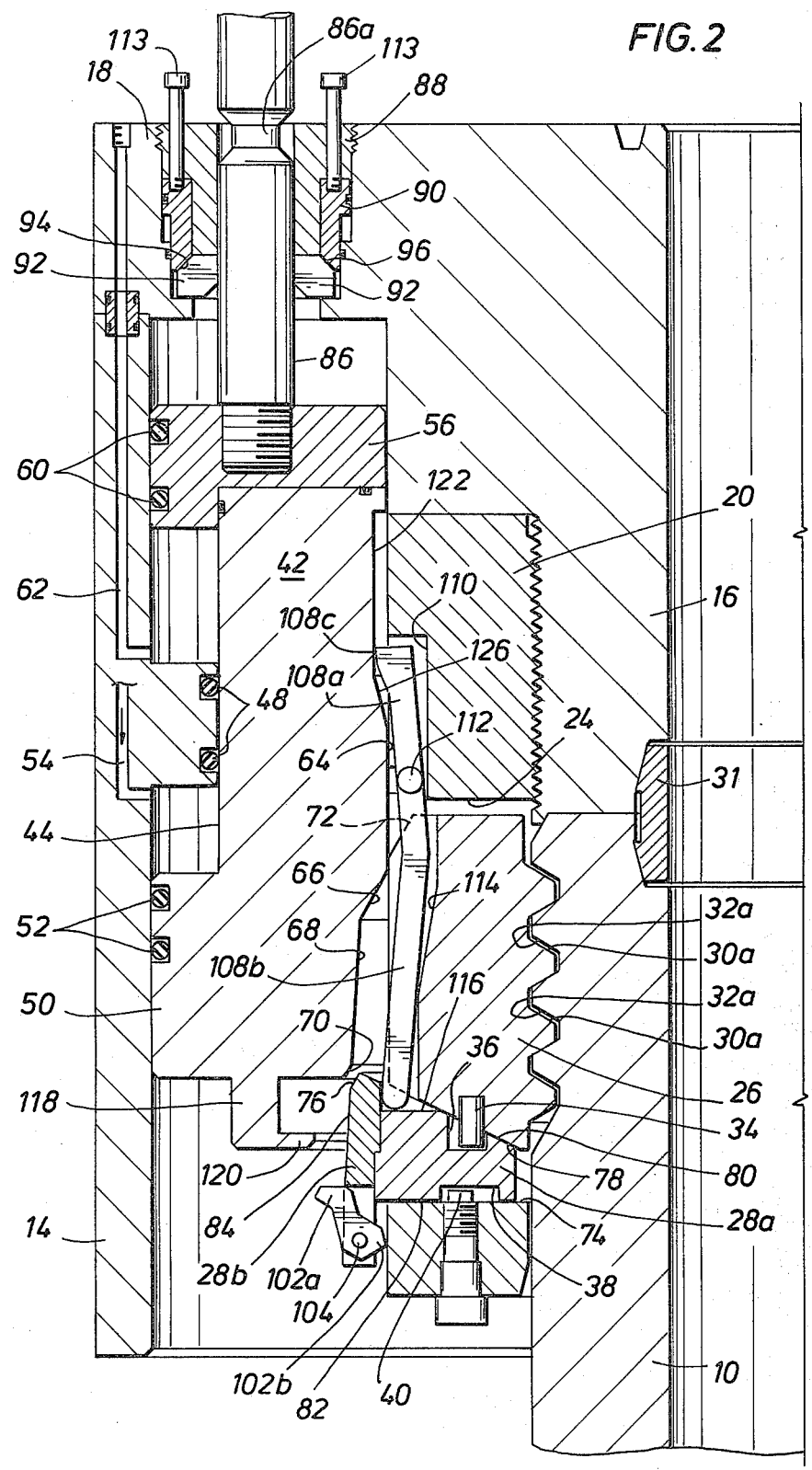
FIG. 2 is an enlarged detailed view of the apparatus of FIG. 1 in a different position.

FIG. 2 shows pertinent portions of the apparatus part way through the downward stroke of piston 22, and more specifically, after cam surface 66 of the piston has moved downwardly past cam surfaces 72 of latch dogs 26 and cam surface 70 has moved past cam surfaces 76 of wedges 28. It can be seen that, at this point, latch dogs 26 are in full latching engagement with wellhead 10 via formations 30 and 32. In other words, the generally upwardly facing surfaces 30a on the saw tooth formation of dogs 26 and the generally downwardly facing surfaces 32a on the grooves of the wellhead have been brought into opposition with each other whereby they may serve as latching surfaces to prevent upward movement of the wellhead connector from the wellhead. However, even though latch dogs 26 have been moved to substantially their full radially extended position, the connection has not yet been tightened longitudinally since wedges 28 are still in their radially outer positions with respect to dogs 26.

As previously mentioned, the latching surfaces 30a of latch dogs 26 face generally upwardly. The generally downwardly facing underside 78 of each dog 26 abuts generally upwardly facing surface 80 of the respective support wedge 28. Opposed surfaces 78 and 80 will be referred to herein as "support surfaces" since they support dogs 26 or resist movement thereof longitudinally in a direction which would tend to separate latching surfaces 30a and 32a. Wedges 28 are in turn supported by their lower surfaces 82 on the upwardly facing surfaces 74 of windows 24, surfaces 74 and 82 being referred to herein as "slide surfaces." In accord with the present invention, after latch dogs 26 have been substantially fully extended, support members 28 are successively urged further radially inwardly wedging between support surfaces 78 of the latch dogs 26 and slide surfaces 74 of the cage 24. Because the opposed support surfaces 78 and 80 of the respective latch dogs and wedges are inclined radially outwardly and longitudinally upwardly, such further radially inward extension of wedges 28 will tighten the connection with the wellhead, more specifically, the engagement between generally longitudinally facing latch surfaces 30a and 32a, without any substantial additional radially inward movement of the latch dogs 26. Accordingly, latch dogs 26 will not dig into the relatively soft metal of wellhead 10 thereby thwarting the effort to tighten the connection. Rather, during the tightening portion of the operation of the tool, all substantial relative movement is between support members or wedges 28, on the one hand, and latch dogs 26 and cage 24, on the other, and all of these parts can be formed of harder metals than wellhead 10.

More particularly, the additional radial extension of wedges 28 is accomplished by further downward movement of piston 22. Referring again to FIG. 2, after cam surfaces 70 and 76 have moved past each other, surface 68 will come into engagement with matingly inclined radially outer surfaces 84 of wedges 28 to cam the later further radially inwardly. This accomplishes the wedging type tightening described above.

Figure 3:
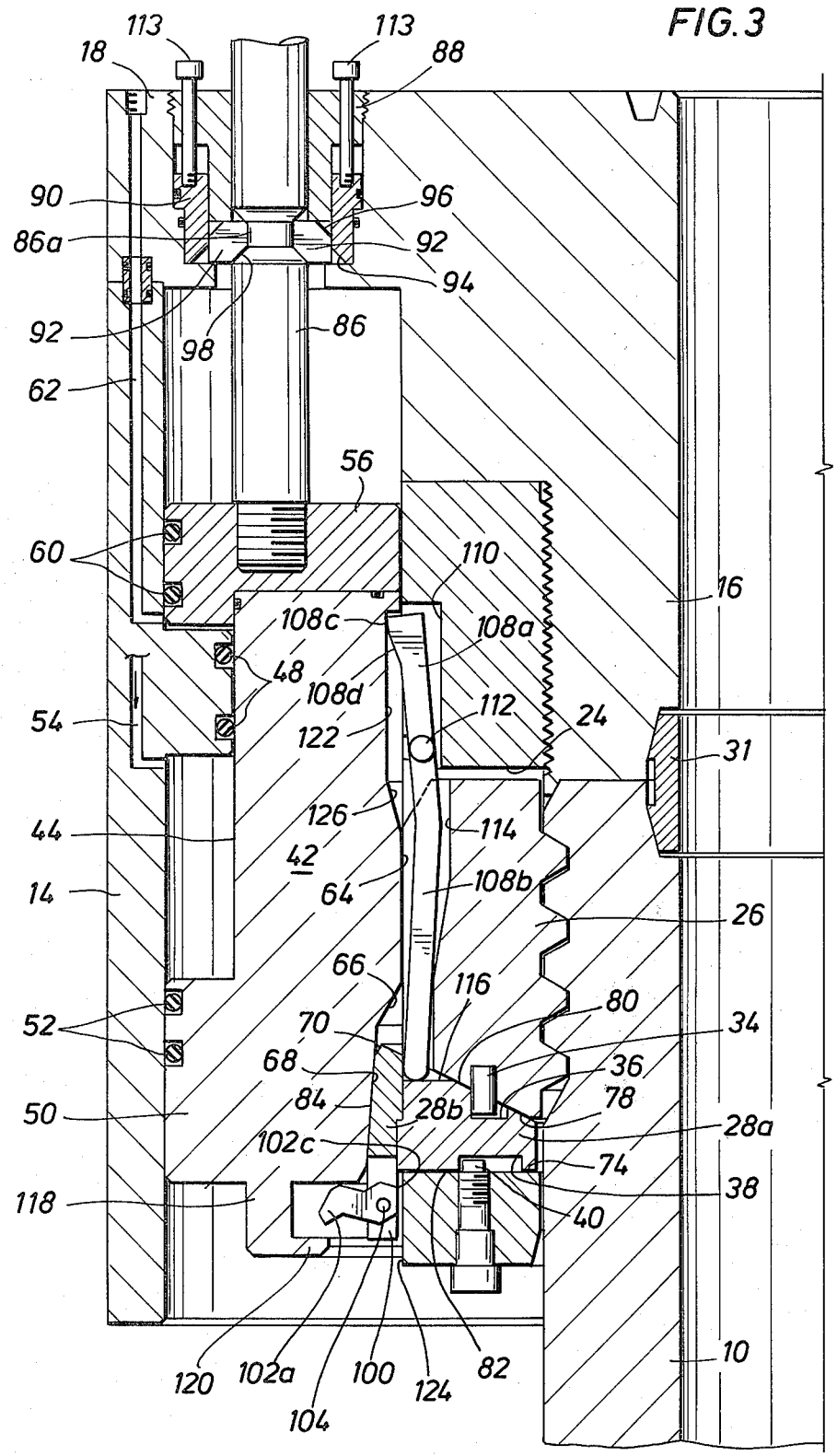
FIG. 3 is a view similar to FIG. 2 showing the apparatus in still another position.

FIG. 3 shows the apparatus with piston 42, 56 in its fully extended or lower position, and with members 26 and 28 in their fully extended or radially inner positions. In this position, surface 64 of piston member 42 radially abuts the outer side of latch dogs 26, while surface 68 similarly abuts the radially outer sides of wedges 28 to retain them in their extended positions. Piston 42, 56 can be locked in this position by a mechanism shown in the unlocked configuration in FIGS. 1 and 2 and in the locked configuration in FIG. 3. The locking mechanism cooperates with a pair of rods 86 threaded into ring 56 of the piston assembly and extending longitudinally therefrom through respective bushings 88 mounted in the flange 18 of the main body of the wellhead connector. Each bore in flange 18 in which a bushing 88 is mounted is larger than the bushing so that it may also receive a ring piston 90, surrounding the lower, reduced outer diameter portion of the bushing 88, and a set of dog elements 92 mounted below both bushing 88 and piston 90. Piston 90 and dogs 92 have abutting downwardly and radially outwardly inclined cam surfaces 94 and 96 respectively. Rod 86 has its outer diameter, in general, sized for a sliding fit in bushing 88, the inner surfaces of dogs 92 also sliding against the outer diameter of rod 86. However, rod 86 has, intermediate its ends, a necked down or reduced-diameter portion 86a. Rod 86 is further beveled both above and below necked down portion 86a.

Referring now again to FIG. 3, as the main drive piston 42, 56 moves downwardly, each rod 86 moves therewith until its necked down portion 86a is in alignment with dog elements 92. This opens up a space for potential radially inward movement of dog elements 92. To effect such movement, fluid pressure is applied to the upper side of piston 90 through passageways (not shown), and as piston 90 moves downwardly, surfaces 94 and 96 cam dog elements 92 radially inwardly into engagement with necked down portion 86a of rod 86. Piston 90 then moves in behind or radially outwardly of dog elements 92 to retain them in that position as shown in FIG. 3. It should be noted that, in such locking position, the downwardly and radially outwardly beveled surface on rod 86 below its necked down portion 86a abuts matingly beveled surfaces 98 on dog elements 92.

Figure 6:
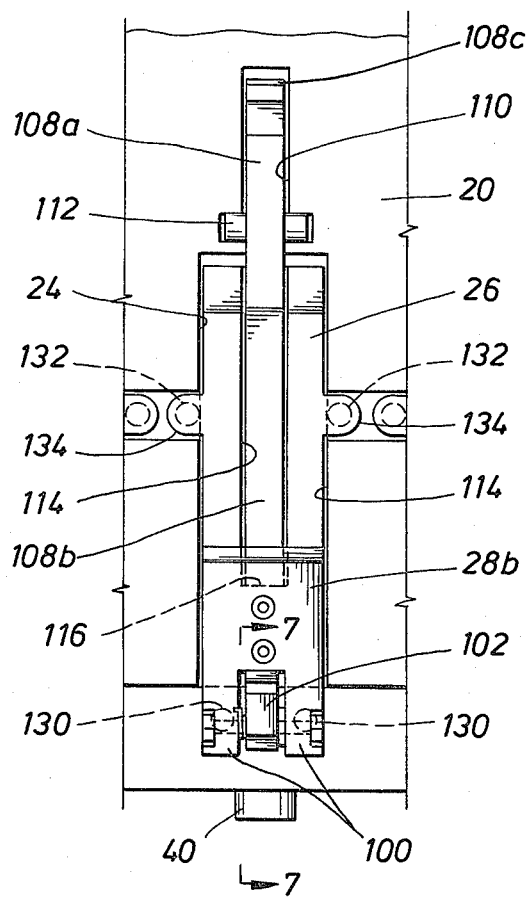
FIG. 6 is a detailed view taken along the line 6—6 in FIG. 1.
Figure 7:
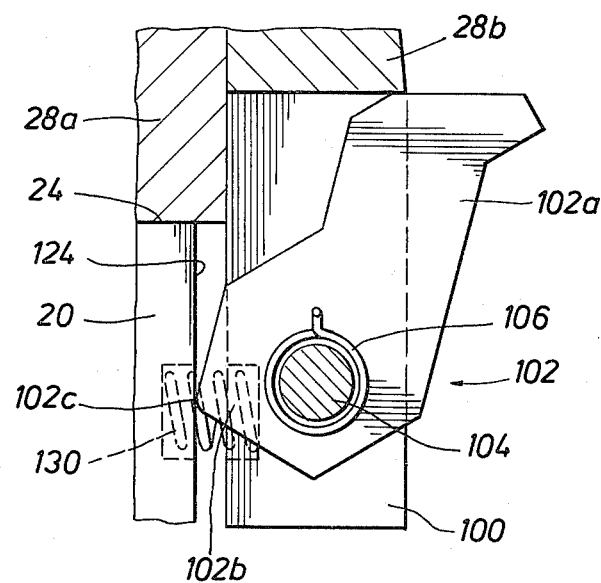
FIG. 7 is a further enlarged detailed view taken along the line 7—7 in FIG. 6.

During the above described movements of the apparatus to the latched and locked position, the release means are automatically moved into the proper positions for retracting members 26 and 28 upon a return stroke of piston 22. Referring again to FIGS. 1 and 5 together with FIGS. 6 and 7, the outer portion 28b of each of the support members 28 has an integral pair of tangs forming a clevis 100 depending downwardly so that it opposes the outer surface of cage 20 just below the respective window 24. The release means includes a first set of levers 102, each of which is pivotally mounted, by a pin 104, between the tines of a respective one of the clevises 100. Each of the levers 102 has a short force-receiving arm 102a located generally on the radially outer side of clevis 100, and an even shorter force-transmitting arm 102b located generally on the radially inner side of clevis 100. As shown in FIG. 7, arm 102b has an apical end portion 102c for abutment with the radially outer surface of cage 20 just below the respective window 24. Associated with each lever 102 is a coil spring 106 which surrounds the respective pivot pin 104. Spring 106 has one end fixed with respect to pin 104 and the other end fixed with respect to lever 102 so that it acts, somewhat like a watch spring, to tend to rotate lever arm 102 upwardly and radially inwardly. Such rotation is limited, as shown in FIGS. 1 and 7, by abutment of lever arm 102a with the underside of outer wedge portion 28b at its juncture with tangs 100. It should be noted that, in this position, the end of lever arm 102a extends radially outwardly beyond the respective wedge 28 into the path of piston member 42.

The release means further includes a second set of levers 108. Comparing FIGS. 1 and 6, it can be seen that cage 20 has a plurality of radially outwardly opening slots 110 each extending upwardly from a respective one of the windows 24. Each of the levers 108 is pivotally mounted on cage 20 by a respective pin 112 located near the lower end of a respective one of the slots 110. Each lever 108 has a force-receiving arm 108a extending generally upwardly from pin 112 in slot 110, the arm 108a having an enlarged end portion 108c which extends slightly outwardly from cage 20 for engagement with piston member 42. Each lever 108 further includes a force-transmitting arm 108b which extends downwardly through a radially outwardly opening slot 114 in the respective latch dog 26. The end portion of force-transmitting arm 108b is engaged in a recess 116 in the respective support member 28 formed at the juncture of the inner portion 28a and outer portion 28b thereof.

For a purpose to be described more fully below, piston member 42 is provided with an integral annular hook structure comprising a generally cylindrical annular leg 118 extending downwardly from the underside of member 42 and an annular horizontal leg 120 extending radially inwardly from the lower end of leg 118.

Before describing the actual release function of the parts described just above, it will be helpful to note the movements of those parts during the latching process depicted in the sequence of FIGS. 1—3. As shown in FIG. 1, when members 26 and 28 and piston 22 are in their fully retracted positions, each of the levers 102 of the first set has its force-receiving arm 102a urged into abutment with the underside of wedge portion 28b above clevis 100. Each lever 108 of the second set has its force-receiving arm 108b urged deeply into slot 110 in cage 24 by abutment of its widened end portion 108c with relatively small diameter surface 64 of piston member 42.

As shown in FIG. 2, as piston member 42 moves downwardly, a counterbored surface 122 on piston member 42 above surface 64 comes into radial alignment with widened lever end portion 108c thus freeing force-receiving arm 108a for potential radially outward movement. Such movement does in fact occur as the force-transmitting arm 108b is pivoted radially inwardly along with members 26 and 28. Hook structure 118, 120 is sized to clear force-receiving arm 102a of lever 102 as the piston moves downwardly. However, as shown in FIG. 3, as piston member 42 moves even further downwardly, its underside will abut arm 102a pivoting it downwardly. This pivots the apical end portion 102c upwardly and radially outwardly away from the radially outer surface 124 of cage 20 below window 24. This in turn permits pivot pin 104 to move radially inwardly toward surface 124 as the attached wedge 28 is radially inwardly extended.

With lever 102 thus pivoted to the position shown in FIG. 3, horizontal leg 120 of the hook structure of the piston member opposes force-receiving arm 102a of lever 102. Also, a beveled surface 126 connecting surfaces 64 and 122 of piston member 42 opposes a similarly inclined surface 108d adjacent widened end 108c of the force-receiving arm of the second lever 108. It should be noted that the distance between leg 120 of the hook structure and arm 102a of the first lever is much less than that between surfaces 126 and 108d.

Figure 4:
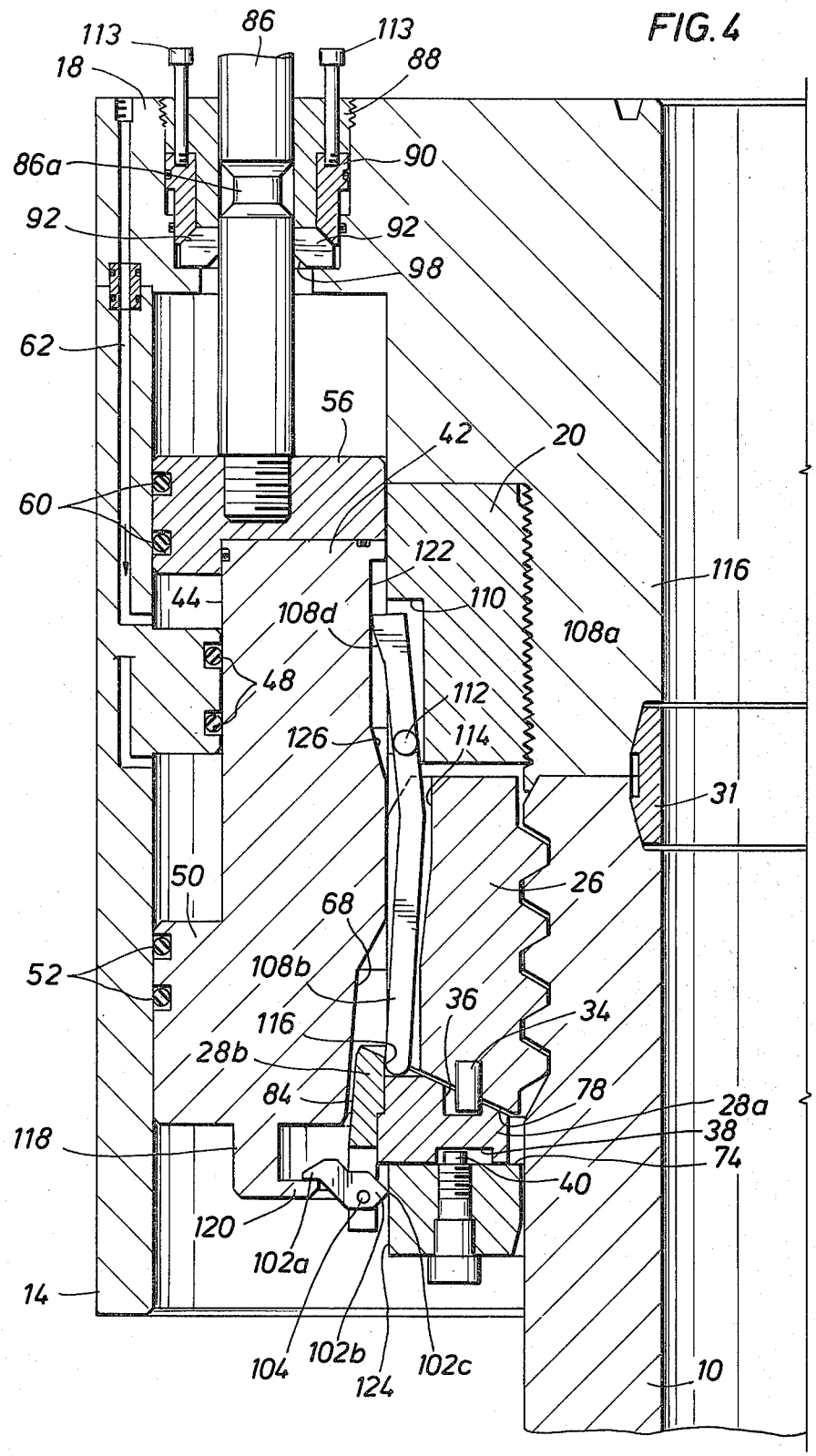
FIG. 4 is a view similar to FIG. 2 showing the apparatus in still another position.

Referring now to FIG. 4, when it is desired to release the wellhead connector from wellhead 10, the locking mechanism is first disengaged. This is accomplished by applying fluid pressure, via passageways not shown, to urge pistons 90 upwardly thus freeing dog elements 92 for potential radially outward movement with respect to rods 86. Fluid pressure is then applied to upper piston head 56 of the main drive piston through passageway 62. As piston member 42 moves upwardly, and surfaces 64 and 68 thereof move out of alignment with respective sets of members 26 and 28, the latter are freed for potential retraction. Still referring to FIG. 4, it can be noted that, since surfaces 68 and 84 are inclined, a clearance is provided between those surface for potential radially outward movement of wedge 28 after a relatively small amount of upward movement of piston member 42, and more specifically, even before surfaces 68 and 84 have moved out of alignment with each other.

As previously mentioned, the preceding downward movement of piston member 42 which had occurred during the latching procedure will have caused rotation of first levers 102. Referring to the exemplary one of said levers shown in FIG. 4, and bearing in mind that all the other first levers would be in analogous positions at any given time, lever 102, as shown in FIG. 3, will have been rotated counterclockwise to a position in which its force-receiving arm 102a extends radially outwardly into the path of leg 120 of the hook structure on piston member 42. As piston member 42 begins to move upwardly, its underside will move away from arm 102a freeing it to rotate, under the influence of spring 106, in a clockwise direction. However, since pivot pin 104 will, during the latching procedure, have been moved closer to abutment surface 124 of cage 20, such clockwise rotation will be limited by abutment of end portion 102c of arm 102b with surface 124. More specifically, as shown in FIG. 4, the position in which the abutment of surfaces 102c and 124 stops lever 102 leaves its force-receiving arm 102a still jutting outwardly into the path of hook leg 120. FIG. 4 shows the apparatus just as hook leg 120 has come into engagement with force-receiving arm 102a of first lever 102. Upon continued upward movement of piston member 42, hook leg 120 will rotate lever 102, via arm 102a, in the clockwise direction. This would tend to move end portion 102c of arm 102b closer to surface 124 of cage 20. However, since surfaces 102c and 124 are already in engagement, surface 102c will then become a fulcrum point whereby, upon the aforementioned clockwise rotation, pivot point 104 will be moved radially outwardly away from surface 124. This will, of course, move the entire wedge 28 connected to pivot pin 104 radially outwardly as shown in FIG. 4.

Because force-transmitting arm 102b is very short, the outward movement of wedge 28 caused by the rotation of lever 102 will be very slight. However, only a slight movement is needed to break the tight wedging engagement of wedge 28 between surfaces 74 and 78. Furthermore, arm 102a is also relatively short, as compared to the lever arms of second lever 108. Thus, the relatively high force necessary to break the aforementioned tight wedging engagement can be applied via levers 102 without undue danger of breaking them.

Referring now again to FIG. 2, as piston member 42 continues to move upwardly, hook structure 118, 120 will eventually clear lever arm 102a, and the latter will be urged into abutment with the underside of wedge portion 28b by its spring 106. After piston member 42 has moved upwardly to a point just beyond that shown in FIG. 2, wherein surface 64 has moved upwardly past the radially outer surfaces of dogs 26, beveled surface 126 on piston member 42 will engage beveled surface 108c on the force-receiving arm 108a of second lever 108. Then, upon continued upward movement of piston member 42, lever 108 will be rotated in a clockwise direction, as viewed in FIG. 2, back to the starting postion of FIG. 1. More specifically, force-receiving arm 108a will be forced back into slot 110 in cage 20, while the lower end of force-transmitting arm 108b will be pivoted radially outwardly, carrying with it wedge 28. As soon as wedge 28 moves to a position in which pin 34 is located at the radially inner extremity of slot 36, wedge 28 will then carry dog 26 radially outwardly with it, thereby returning the apparatus to the full unlatched position illustrated in FIG. 1.

To aid in the return of members 26 and 28 to their unlatched positions, springs are provided for biasing these members radially outwardly. Referring to FIGS. 1, 6 and 7, a pair of compression springs 130 are provided for biasing each wedge 28 radially outwardly. Each spring 130 has one end engaged in a recess in the radially inner side of one of the tines of the respective clevis 100, and its other end engaged in a similar recess in cage 20 below the respective window 24. Referring to FIGS. 1 and 6, each of the latch dogs 26 has a pair of ears 134 extending laterally outwardly therefrom so that they oppose the outer surface of cage 20. A series of compression springs 132 are provided, each having one end located in a recess in one of the ears 132, and the other end located in a recess in cage 20.

While the aforementioned release system is operating to return latch dogs 26 and support members 28 to their retracted positions, the beveled surfaces on rods 86 below their respective necked down portions 86a will have cammed dog elements 92 of the locking mechanism radially outwardly, i.e. back to the position shown in FIGS. 1 and 2, so that, ultimately, the entire apparatus returns to its fully retracted position shown in FIG. 1. The locking mechanism is provided with a manual override in the form of pins 113 connected to piston 90 and slidably extending outwardly through bushings 88 so that their heads can be engaged to force piston 90 upwardly mechanically.

The various parts of the release system described above form a series of back up or fail safe devices for one another. For example, should one or more of the levers 102 or their springs 106 somehow be broken, they will simply drop loosely below their clevises 100 so that they do not in any way interfere with proper movements of the actuator piston 22. Nevertheless, retraction of the latch and support members can be achieved by means of second levers 108 in conjunction with springs 130 and 132. On the other hand, should any of the second set of levers 108 be broken, first levers 102 will serve to break the tight wedging engagement of the wedges 28 so that springs 130 and 132 can eventually return these members to their radially retracted positions. However, such breakage will not ordinarily occur, and with all parts of the release system fully operative, they complement one another in achieving various aspects of the release process as described above.

Numerous modifications of the preferred embodiments described above can be made without departing from the spirit of the invention. By way of example only, some connectors could be provided with only one set of release levers, and the form and/or exact location of these levers could varied. The invention could also be adapted for use with other types of wellhead connectors, such as those in which the latch dogs might pivot, rather than moving rectilinearly, and/or those in which the actuator may be in some form other than that of a longitudinally reciprocable ring piston. Still other variations will suggest themselves to those of skill in the art. Accordingly, it is intended that the scope of the invention be limited only by the claims which follow.

We claim:
1. Apparatus for connecting a pair of tubular bodies in generally coaxial alignment, comprising:
   a plurality of movable members carried by one of said bodies for generally radial extension and retraction with respect thereto;
   drive means movably carried by said one body and operatively associated with said movable members, said drive means being operative, upon movement in a first direction, to radially extend said movable members;
   and release means pivotally interengaged between said one body and said movable members when said movable members are so extended and operative, upon pivotal movement, to at least partially radially retract said movable members, said release means comprising a first set of levers each pivotally mounted on a respective one of said movable members and having a force-transmitting arm engagable with said one body and further having a force-receiving arm; and
   said drive means further being engagable with said force receiving arms and operative, upon movement in a second direction opposite to said first direction, to so pivotally move said first set of levers to at least partially radially retract said movable members.

2. The apparatus of claim 1 wherein said one body comprises a cage having a plurality of circumferentially spaced windows opening generally radially therethrough, each of said movable members being movably mounted in a respective one of said windows, said cage having abutment surface means, and the force-transmitting arm of each of said first levers having an end portion abutable with said abutment surface means to form a fulcrum point whereby, upon pivotal movement of said first lever in a first directional mode, the pivotal connection point between said first lever and said movable member can be urged away from said abutment surface means.

3. The apparatus of claim 2 further comprising spring means cooperative between each of said first levers and the respective movable member to bias said first lever in said first directional mode, and stop means cooperative between said first lever and said movable member to limit the movement of said first lever in said first directional mode.

4. The apparatus of claim 2 wherein:
   said drive means comprises an annular piston generally surrounding said cage, and said first and second directions of movement of said piston are longitudinal;
   said piston and said movable members have cam surfaces cooperative upon movement of said piston in said first direction to radially extend said movable members;
   and said drive means further comprises catch means extending from said piston and engageable with said force-receiving arms of said first levers upon movement of said piston in said second direction to pivotally move said first levers in said first directional mode.

5. The apparatus of claim 4 wherein said piston, upon movement in said first direction, is further engageable with said force-receiving arms of said first levers to pivot said first levers in a second directional mode opposite to said first directional mode whereby said end portions of said force transmitting arms are moved away from said abutment surface means of said cage; and wherein said radial extension of said movable members moves the pivotal connection points between said first levers and said movable members toward said abutment surface means.

6. The apparatus of claim 5 wherein each of said movable members comprises tang means extending from an outer portion thereof outwardly of said cage and generally adjacent said abutment surface means, said respective first lever being mounted on said tang means.

7. The apparatus of claim 1 wherein said release means further include a set of second levers each pivotally carried by said one body and having a force-receiving arm engageable with and movable by said drive means and a force-transmitting arm engageable with a respective one of said movable members.

8. The apparatus of claim 7 wherein said movement of said drive means in said first direction comprises a longitudinal extension stroke and said movement in said second direction comprises a longitudinal retraction stroke; and wherein said drive means engages said first and second levers successively during said retraction stroke.

9. The apparatus of claim 8 wherein said drive means and said force-receiving arms of said second levers have cam surfaces for said engagement.

10. Apparatus for connecting a pair of tubular bodies in general coaxial alignment, comprising:
a plurality of circumferentially spaced latch dogs, carried by one of said bodies for generally radial extension and retraction, for latching engagement with the other of said bodies upon such radial extension;
a set of movable support members carried by said one body for generally radial extension and retraction with respect thereto, said support members being associated in one-to-one relation with said latch dogs, said support members being so radially extendable and retractable at least partially independently of said latch dogs and, upon such radial extension, wedging between said latch dogs and said one body;
drive means movably carried by said one body and operatively associated with said support members, said drive means being operative, upon movement in a first direction, to radially extend said support members;
and release lever means pivotally interengaged between said one body and said support members when said support members are so extended and operative, upon pivotal movement, to at least partially radially retract said support members; and said drive means further being operatively associated with said release lever means and operative, upon movement in a second direction opposite to said first direction, to so pivotally move said release lever means.

11. The apparatus of claim 10 being a wellhead connector apparatus adopted for connection to a wellhead.

12. The apparatus of claim 10 wherein said release means include a set of first levers and a set of second levers, each of said support members engaging a respective one of said first levers and a respective one of said second levers;
wherein said movement of said drive means in said first direction comprises a longitudinal extension stroke and said movement in said second direction comprises a longitudinal retraction stroke;
and wherein said drive means engages said first and second levers successively during said retraction stroke.

13. The apparatus of claim 12 wherein said first levers have short lever arms relative to said second levers.

14. The apparatus of claim 13 wherein said drive means, in said extension stroke, successively engages and radially extends said latch dogs and said support members.

15. The apparatus of claim 14 further comprising link means interconnecting said latch dogs and support members and limiting relative radial movement therebetween whereby, upon partial retraction of said support members, further radial retraction of said support members will cause radial retraction of said latch dogs jointly therewith.

16. The apparatus of claim 13 further comprising spring means biasing said latch dogs and support members to their retracted positions.

17. The apparatus of claim 13 wherein each of said first levers is pivotally mounted on a respective one of said support members and has a force-receiving arm engageable with and movable by said drive means and a force-transmitting arm engageable with said one body.

18. The apparatus of claim 17 wherein each of said second levers is pivotally carried by said one body and has a force-receiving arm engageable with and movably by said drive means and a force-transmitting arm engageable with a respective one of said support members.

* * * * *

UNITED STATES PATENT AND TRADEMARK OFFICE
CERTIFICATE OF CORRECTION

PATENT NO. : 4,433,859
DATED : February 28, 1984
INVENTOR(S) : Gary R. Driver; Richard J. Herman It is certified that error appears in the above—identified patent and that said Letters Patent is hereby corrected as shown below:

In Column 12, line 8, after "release" insert --lever--.

Signed and Sealed this

Fifth Day of February 1985

[SEAL]

Attest:

DONALD J. QUIGG

Attesting Officer  Acting Commissioner of Patents and Trademarks